(12) United States Patent
Li et al.

(10) Patent No.: US 10,095,335 B2
(45) Date of Patent: Oct. 9, 2018

(54) IN-CELL TYPE TOUCH PANEL AND MANUFACTURING METHOD THEREOF, LIQUID CRYSTAL DISPLAY DEVICE

(71) Applicant: Wuhan China Star Optoelectronics Technology Co., Ltd., Wuhan, Hubei (CN)

(72) Inventors: Man Li, Guangdong (CN); Xingling Guo, Guangdong (CN); Zhenzhou Xing, Guangdong (CN)

(73) Assignee: Wuhan China Star Optoelectronics Technology Co., Ltd, Wuhan, Hubei (CN)

(*) Notice: Subject to any disclaimer, the term of this patent is extended or adjusted under 35 U.S.C. 154(b) by 183 days.

(21) Appl. No.: 15/100,370

(22) PCT Filed: May 12, 2016

(86) PCT No.: PCT/CN2016/081778
§ 371 (c)(1),
(2) Date: May 31, 2016

(87) PCT Pub. No.: WO2017/185410
PCT Pub. Date: Nov. 2, 2017

(65) Prior Publication Data
US 2018/0081470 A1    Mar. 22, 2018

(30) Foreign Application Priority Data

Apr. 27, 2016   (CN) .......................... 2016 1 0268362

(51) Int. Cl.
*G02F 1/1343* (2006.01)
*G06F 3/041* (2006.01)
(Continued)

(52) U.S. Cl.
CPC .......... *G06F 3/0412* (2013.01); *G02F 1/1368* (2013.01); *G02F 1/13338* (2013.01);
(Continued)

(58) Field of Classification Search
CPC ..................................................... G06F 3/0412
See application file for complete search history.

(56) References Cited

U.S. PATENT DOCUMENTS

| 2010/0103121 A1* | 4/2010 | Kim | .................... G02F 1/13394 345/173 |
| 2012/0105347 A1* | 5/2012 | Pak | ........................ G06F 3/0412 345/173 |

(Continued)

FOREIGN PATENT DOCUMENTS

| CN | 102375277 A | 3/2012 |
| CN | 104699357 A | 6/2015 |
| CN | 104808375 A | 7/2015 |
| CN | 104866153 A | 8/2015 |

*Primary Examiner* — Sang V Nguyen
(74) *Attorney, Agent, or Firm* — Andrew C. Cheng

(57) ABSTRACT

An in-cell type touch panel, a manufacturing method thereof and a LCD device are provided. The touch panel includes an array substrate including: a glass substrate, thin film transistors, a planarization layer overlying the thin film transistors, a connecting wire on the planarization layer, a first insulating layer overlying the connecting wire, a touch sensing electrode on the first insulating layer, a second insulating layer overlying the touch sensing electrode and a pixel electrode on the second insulating layer. The connecting wire is connected to the touch sensing electrode by a first via hole, and the pixel electrode is connected to one of the thin film transistors by a second via hole. The touch sensing electrode further is configured as a common electrode, and during a displaying time period of an image frame, the touch sensing electrode transmits a common voltage and a touch control signal in time division manner.

16 Claims, 2 Drawing Sheets

(51) Int. Cl.
*G02F 1/1333* (2006.01)
*G02F 1/1368* (2006.01)
*G02F 1/1362* (2006.01)
*G02F 1/1335* (2006.01)
*G06F 3/044* (2006.01)

(52) U.S. Cl.
CPC .... *G02F 1/13439* (2013.01); *G02F 1/133514* (2013.01); *G02F 1/136227* (2013.01); *G02F 1/136286* (2013.01); *G06F 3/044* (2013.01); *G06F 3/0416* (2013.01); *G02F 2001/133302* (2013.01); *G02F 2001/136295* (2013.01); *G02F 2201/121* (2013.01); *G02F 2201/123* (2013.01); *G06F 2203/04103* (2013.01); *G06F 2203/04104* (2013.01); *G06F 2203/04111* (2013.01)

(56) References Cited

U.S. PATENT DOCUMENTS

| | | | |
|---|---|---|---|
| 2014/0362031 A1* | 12/2014 | Mo | G09G 3/36 345/174 |
| 2015/0042903 A1* | 2/2015 | Misaki | G06F 3/044 349/12 |
| 2016/0018935 A1* | 1/2016 | Wei | G06F 3/044 345/173 |
| 2016/0124280 A1* | 5/2016 | Park | G02F 1/136286 349/43 |
| 2016/0180781 A1* | 6/2016 | Kim | G06F 3/0416 345/212 |
| 2016/0190178 A1* | 6/2016 | Ding | H01L 27/1244 257/659 |
| 2016/0283000 A1* | 9/2016 | Wang | G06F 3/041 |
| 2016/0294386 A1* | 10/2016 | Yang | G06F 3/0416 |
| 2017/0010493 A1* | 1/2017 | Yu | G06F 3/044 |

* cited by examiner

IN-CELL TYPE TOUCH PANEL AND MANUFACTURING METHOD THEREOF, LIQUID CRYSTAL DISPLAY DEVICE

TECHNICAL FIELD

The invention relates to the field of touch control technology, and more particularly to an in-cell type touch panel and a manufacturing method thereof, and further relates to a liquid crystal display (LCD) device including the in-cell type touch panel.

DESCRIPTION OF RELATED ART

A touch control display panel as an input medium is the most simple and convenient means of human-computer interaction and therefore more and more touch control display panels are applied to a variety of electronic products. Based on different working principles and media of information transmission, touch panel products can be classified into four kinds of infrared touch panel, capacitive touch panel, resistive touch panel and surface acoustic wave touch panel. The capacitive touch panel has become the mainstream touch panel technology owing to its advantages of long lifespan, high transmittance, supporting multi-touch and so on. The capacitive touch panels include surface capacitive type and projected capacitive type, and the projected capacitive type touch panel further can be classified into self-capacitance type and mutual capacitance type. For a self-capacitance type touch control structure, due to its touch sensing accuracy and signal-to-noise ratio are relatively high, it is favored by various major panel manufacturers.

At present, the self-capacitance type touch control structure uses the principle of self capacitance to realize the detection of finger touch position and specifically is that: multiple (i.e., more than one) touch sensing electrodes are arranged in the touch control structure, when the human body does not touch the panel, a capacitance detected by each touch sensing electrode is a fixed value, and whereas when the human body touches the panel, the capacitance detected by the touch sensing electrode corresponding to the touched position is affected by the human body, and then a touch detection chip can determine the touched position by detecting the change of capacitance value of each touch sensing electrode in a touch control time period.

For a self-capacitance in-cell type touch panel, touch sensing electrodes and metal connection wires in the touch control structure usually are directly arranged on an array substrate or a color filer substrate. FIG. 1 is a structural schematic view of a conventional array substrate with a touch control structure. As shown in FIG. 1, the array substrate includes: a glass substrate 1, thin film transistors 2 disposed on the glass substrate 1 in an array, a planarization layer 3 disposed overlying the thin film transistors 2, multiple touch sensing electrodes 4 (FIG. 1 only exemplarily shows one touch sensing electrode) formed on the planarization layer 3, an insulating layer 5 disposed overlying the touch sensing electrodes 4, a connecting wire 6 formed on the insulating layer 5, another insulating layer 7 disposed overlying the connecting wire 6, and a pixel electrode 8 formed on the insulating layer 7. The connecting wire 6 is connected to the touch sensing electrode 4 by a via hole formed in the insulating layer 5 and for connecting the touch sensing electrode 4 to an external touch detection chip. The pixel electrode 8 is connected to the thin film transistor 2 by a via hole disposed in the insulating layer 7, the insulating layer 5 and the planarization layer 3. As shown in FIG. 2, multiple touch sensing electrodes 4 are arranged in an array, and each of the touch sensing electrodes 4 needs one individual connecting wire 6 to connect with the touch detection chip 9. Specifically, for a column of touch sensing electrodes 4, each connecting wire 6 before being connected to a corresponding touch sensing electrode 4 is not connected to the preceding touch sensing electrode(s) and after being connected to the corresponding touch sensing electrode 4 will not continue to connect with the succeeding touch sensing electrode(s). The touch sensing electrodes 4 further are multiplexed as common electrodes, and thus during a displaying period of a frame of image, the touch sensing electrodes 4 each transmit/deliver a common voltage (Vcom) and a touch control signal in time division manner.

In the above-described touch control structure, the touch sensing electrode 4 and the connecting wire 6 are arranged in different layers and have the insulating layer 5 interposed therebetween, and therefore the touch sensing electrode 4 and the connecting wire 6 would together form a parasitic capacitance. The parasitic capacitance would be coupled with a useful capacitance signal generated by the finger's touch to form a noise interference, which would result in the signal-to-noise ratio (SNR) of the touch panel is decreased. One of means for improving the signal-to-noise ratio of the touch panel is to reduce the parasitic capacitance between the touch sensing electrode 4 and the connecting wire 6, and a conventional method of reducing the parasitic capacitance formed by the touch sensing electrode 4 and the connecting wire 6 is to increase the thickness of the insulation layer 5 between the touch sensing electrode 4 and the connecting wire 6.

However, referring to FIG. 1, for the array substrate with the above-described structure, the positional relationship among the touch sensing electrode 4, the connecting wire 6 and the pixel electrode 8 is from bottom to top in that order, since each the touch sensing electrode 4 further is multiplexed as a common electrode, a storage capacitor (Cst) is formed between the touch sensing electrode 4 and the pixel electrode 8. If adopting the above-described method of increasing the thickness of the insulating layer 5 to achieve the purpose of reducing the parasitic capacitance formed by the touch sensing electrode 4 and the connecting wire 6, the storage capacitor formed between the touch sensing electrode 4 and the pixel electrode 8 is correspondingly reduced, the reduction of the storage capacity would lead to the charge of a pixel cannot be maintained, and a direct impact is that the pixel would not be charged to a set grayscale, and finally the LCD device cannot correctly display picture content. Therefore, with regard to the conventional array substrate with the touch control structure as shown in FIG. 1, the method of increasing the thickness of the insulating layer 5 between the touch sensing electrode 4 and the connecting wire 6 so as to reduce the parasitic capacitance formed by the touch sensing electrode 4 and connecting wire 6 will do more harm than good.

SUMMARY

In view of the drawbacks in the prior art, the invention provides an in-cell type touch panel, by improving a touch control structure disposed in an array substrate, under the premise of not affecting the magnitude of a storage capacitor, a parasitic capacitance formed in the touch control structure can be reduced and the signal-to-noise ratio of the touch panel is improved consequently.

In order to achieve the above objective, the invention proposes following technical solutions.

An in-cell type touch panel includes an array substrate. The array substrate includes: a glass substrate, thin film transistors disposed on the glass substrate in an array, a planarization layer disposed overlying the thin film transistors, a connecting wire formed on the planarization layer, a first insulating layer disposed overlying the connecting wire, a touch sensing electrode formed on the first insulating layer, a second insulating layer disposed overlying the touch sensing electrode, and a pixel electrode formed on the second insulating layer. The connecting wire is electrically connected to the touch sensing electrode by a first via hole formed in the first insulating layer. The pixel electrode is electrically connected to a corresponding one of the thin film transistors by a second via hole formed in the second insulating layer, the first insulting layer and the planarization layer. The touch sensing electrode further is configured as a common electrode, and during a displaying time period of a frame of image, the touch sensing electrode is configured (i.e., structured and arranged) for transmitting a common voltage and a touch control signal in time division manner.

In an embodiment, a material of the connecting wire is a metal material, a material of the touch sensing electrode and a material of the pixel electrode each are ITO (indium tin oxide).

In an embodiment, a material of the first insulating layer and a material of the second insulating layer each are $SiN_x$, $SiO_x$ or $SiN_xO_y$.

In an embodiment, each of the thin film transistors includes a source electrode, a drain electrode, a gate electrode and an active layer. The active layer is connected onto the glass substrate. The source electrode and the drain electrode are disposed in a same layer and located above the active layer. The gate electrode is disposed above the source electrode and the drain electrode. A third insulating layer is disposed between the source electrode and the active layer as well as between the drain electrode and the active layer. The source electrode and the drain electrode respectively are connected to the active layer by via holes formed in the third insulating layer. A fourth insulating layer is disposed between the source electrode and the gate electrode as well as between the drain electrode and the gate electrode.

In an embodiment, an ohmic contact layer is disposed between the active layer and the source electrode as well as between the active layer and the drain electrode.

In an embodiment, a material of the third insulating layer and a material of the fourth insulating layer each are $SiN_x$, $SiO_x$ or $SiN_xO_y$.

In an embodiment, the in-cell type touch panel further includes a color filter substrate disposed opposite to the array substrate and a liquid crystal layer arranged between the array substrate and the color filter substrate.

In an embodiment, a fifth insulating layer is disposed between the planarization layer and the connecting wire, a material of the fifth insulating layer is $SiN_x$, $SiO_x$ or $SiN_xO_y$.

Moreover, a manufacturing method of the above descried in-cell type touch panel includes a process of forming an array substrate. The process of forming an array substrate includes steps of: S10, providing a glass substrate and forming an array of thin film transistors on the glass substrate; S20, forming a planarization layer on the glass substrate having the thin film transistors formed thereon; S30, forming a connecting wire on the planarization layer; S40, forming a first insulating layer on the planarization layer having the connecting wire form thereon; S50, forming a first via hole in a position of the first insulating layer corresponding to the connecting wire; S60, forming a touch sensing electrode on the first insulating layer, wherein the touch sensing electrode is electrically connected to the connecting wire by the first via hole; S70, forming a second insulating layer on the first insulating layer having the touch sensing electrode formed thereon, and forming a second via hole in positions of the second insulating layer, the first insulating layer and the planarization layer corresponding to a corresponding one of the thin film transistors; S80, forming a pixel electrode on the second insulating layer, wherein the pixel electrode is electrically connected to the corresponding thin film transistor by the second via hole.

Another aspect of the invention is to provide a liquid crystal display device. The liquid crystal display device includes a liquid crystal display panel and a backlight module. The liquid crystal display panel and the backlight module are disposed opposite to each other, the backlight module is configured (i.e., structured and arranged) for providing a display light source to the liquid crystal display panel in order to make the liquid crystal display panel display an image. The liquid crystal display panel adopts any one of above described in-cell type touch panels.

Compared with the prior art, for each of the in-cell type touch panels provided by various embodiments of the invention, the array substrate of the in-cell type touch panel is provided with the connecting wire, the touch sensing electrode and the pixel electrode from bottom to top in that order, when the thickness of the first insulating layer between the touch sensing electrode and the connecting wire is increased, a relative distance between the touch sensing electrode and the pixel electrode would not change, and therefore the storage capacitor formed between the touch sensing electrode and the pixel electrode is not changed. Base on the above discussion, in the in-cell type touch panel as provided by the embodiment of the invention, by increasing the thickness of the insulating layer between the touch sensing electrode and the connecting wire, the parasitic capacitance formed by the touch sensing electrode and the connecting wire can be reduced, and the purpose of improving the signal-to-noise ratio of the touch panel can be achieved consequently.

BRIEF DESCRIPTION OF THE DRAWINGS

The above and other aspects, features and advantages of embodiments of the invention will be more apparent from the following detailed description taken in conjunction with the accompanying drawings, in which.

DETAILED DESCRIPTION OF EMBODIMENTS

Figure 1:
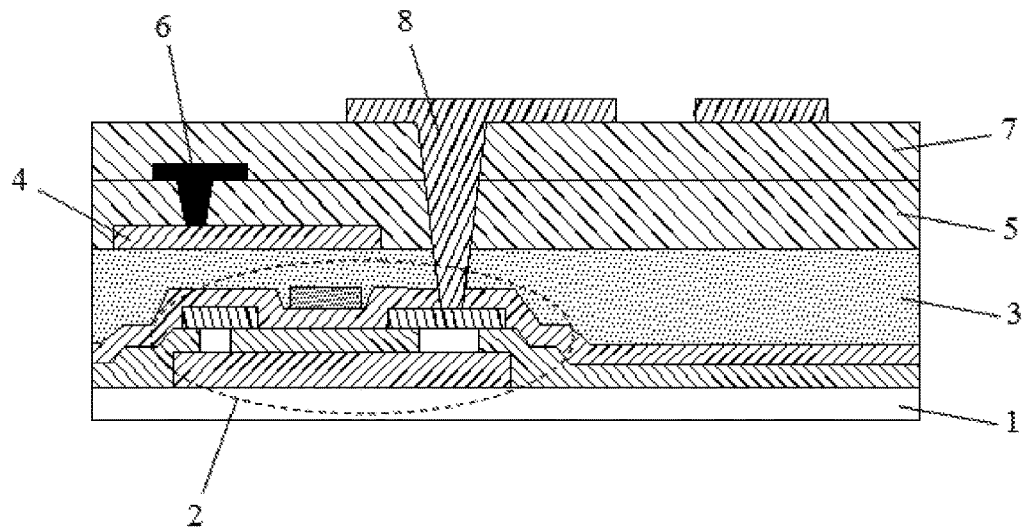
FIG. 1 is a structural schematic view of a conventional array substrate with a touch control structure.
Figure 2:
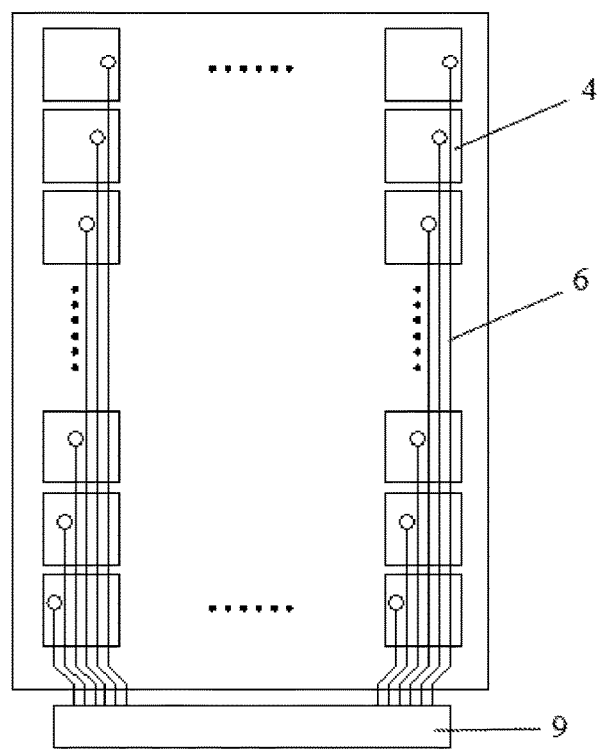
FIG. 2 is a distribution schematic view of touch sensing electrodes in the touch control structure as shown in FIG. 1.

In order to make objectives, technical solutions and advantages of the invention become more apparent, various embodiments of the invention will be described in detail below with reference to accompanying drawings. Examples of these preferred embodiments would be illustrated in the drawings. The illustration in the drawings and the embodiments of the invention described according to the accompanying drawings only are exemplary, and the invention is not limited to these embodiments.

Herein, it should be noted that, in order to avoid unnecessary details to obscure the invention, the accompanying drawings only illustrate structures and/or processing steps closely related to the solution of the invention and omit other details little related to the invention.

Figure 3:
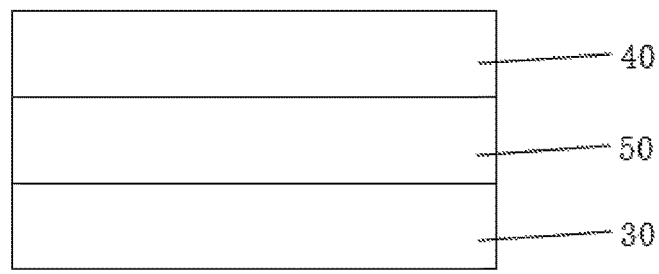
FIG. 3 is a structural schematic view of an in-cell type touch panel according to an embodiment of the invention.

The illustrated embodiment firstly provides an in-cell type touch panel. As shown in FIG. 3, the in-cell type touch panel includes: oppositely disposed array substrate 30 and color filter substrate 40, and a liquid crystal layer 50 arranged between the array substrate 30 and the color filter substrate 40. A touch control structure is embedded in the array substrate 30.

Figure 4:
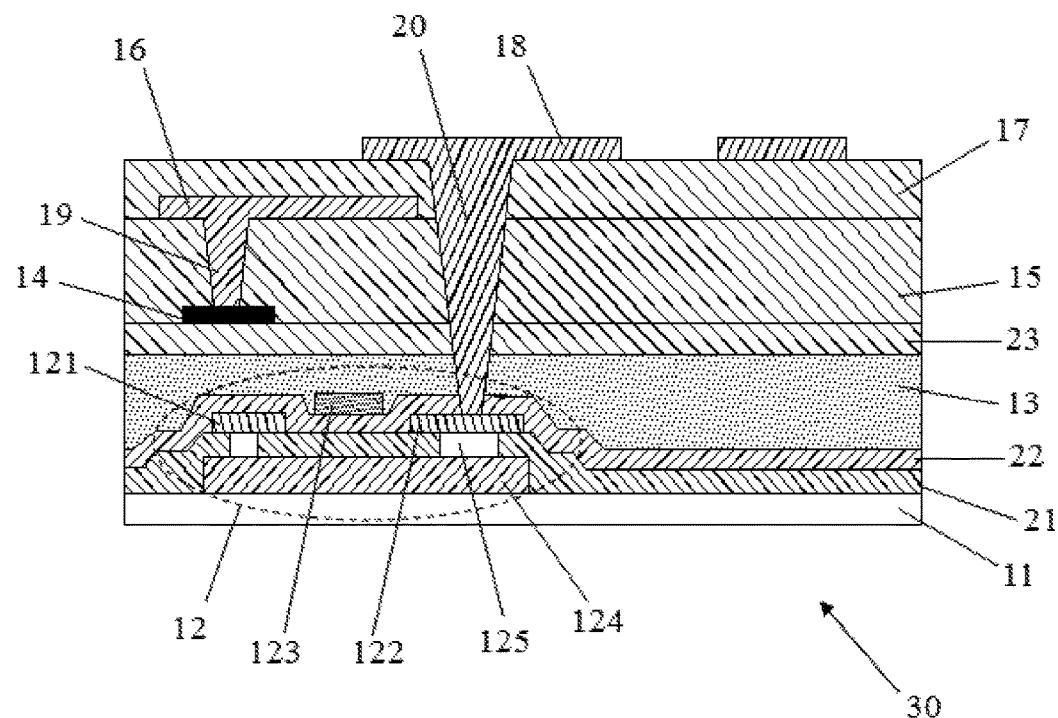
FIG. 4 is a structural schematic view of an array substrate with a touch control structure according to an embodiment of the invention.

Specifically, as shown in FIG. 4, the array substrate 30 includes: a glass substrate 11 and an array of thin film transistors 12, a planarization layer 13, a connecting wire 14, a first insulating layer 15, a touch sensing electrode 16, a second insulating layer 17 and a pixel electrode 18 sequentially formed on the glass substrate 11 in that order. In particular, a plurality of thin film transistors 12 (FIG. 4 only exemplarily show one thin film transistor) firstly are arranged on the glass substrate 11, the planarization layer 13 is disposed overlying/covering the thin film transistors 12, the connecting wire 14 is formed on the planarization layer 13, the first insulating layer 15 is disposed overlying the connecting wire 14, the touch sensing electrode 16 is formed on the first insulating layer 15, the second insulation layer 17 is disposed overlying the touch sensing electrode 16, and the pixel electrode 18 is formed on the second insulating layer 17.

The first insulating layer 15 is provided with a first via hole 19, the connecting wire 14 is electrically connected to the touch sensing electrode 16 by the first via hole 19 and for connecting the touch sensing electrode 16 to an external touch detection chip (not shown in the drawings). Positions of the second insulting layer 17, the first insulating layer 15 and the planarization layer 13 corresponding to the thin film transistor 12 are provided with a second via hole 20. The pixel electrode 18 is electrically connected to the thin film transistor 12 (i.e., electrically connected to a source electrode or a drain electrode of the thin film transistor 12) by the second via hole 20.

The number of the touch sensing electrodes 16 is multiple, and the multiple touch sensing electrodes 16 are arranged in an array to form a self-capacitance type touch control structure. The multiple touch sensing electrodes 16 further are configured as common electrodes, and therefore during a displaying time period of a frame of image, the touch sensing electrodes 16 each are used for transmitting/delivering a common voltage and a touch control signal in time division manner.

Materials of the touch sensing electrodes 16 and the pixel electrode 18 each are a transparent electrically conductive material, e.g., ITO may be selected. A material of the planarization layer 13 is an organic material. A material of the connecting wire 14 is a metal material and the connecting wire 14 can be composed of a multilayered metal material for example may be a sequentially-arranged Mo/Al/Mo tri-layered metal material.

In the array substrate with the above structure, the touch control structure includes the connecting wire 14 and the touch sensing electrode 16 sequentially formed on the planarization layer 13 in that order. A positional relationship among the connecting wire 14, the touch sensing electrode 16 (common electrode) and the pixel electrode 18 is from bottom to up in that order, when the thickness of the first insulating layer 15 between the touch sensing electrode 16 and the connecting wire 14 is increased, the relative distance between the touch sensing electrode 16 and the pixel electrode 18 would not change, and therefore a storage capacitance (Cst) formed between the touch sensing electrode 16 and the pixel electrode 18 is not changed. Accordingly, in the above-described in-cell type touch panel, by increasing the thickness of the insulating layer between the touch sensing electrode 16 and the connecting wire 14 (the increased size of the thickness can be determined according to actual requirement, and the invention is not specifically limited), it can reduce the parasitic capacitance formed by the touch sensing electrode 16 and the connecting wire 14 and achieve the purpose of improving the signal-to-noise ratio of the touch panel.

As shown in FIG. 4, the thin film transistor 12 includes a source electrode 121, a drain electrode 122, a gate electrode 123 and an active layer 124. The active layer 124 is connected onto the glass substrate 11. The source electrode 121 and the drain electrode 122 are disposed in a same layer and located above the active layer 124. The gate electrode 123 is located above the source electrode 121 and the drain electrode 122. A third insulating layer 21 is disposed between the source electrode 121 and the active layer 124 as well as between the drain electrode 122 and the active layer 124. The source electrode 121 and the drain electrode 122 respectively are connected to the active layer 124 through via holes formed in the third insulating layer 21. A fourth insulation layer 22 is disposed between the source electrode 121 and the gate electrode 123 as well as between the drain electrode 122 and the gate electrode 123. In the illustrated embodiment, the pixel electrode 18 is electrically connected to the drain electrode 122 of the thin film transistor 12 by the second via hole 20.

Further, in order to make the source electrode 121 and the active layer 124 as well as the drain electrode 122 and the active layer 124 have good electrical contact therebetween, an ohmic contact layer 125 is arranged between the active layer 124 and the source electrode 121 as well as between the active layer 124 and the drain electrode 122, a specific material of the ohmic contact layer 125 is N+Si.

Still further, in the illustrated embodiment, a material of the first insulating layer 15 and a material of the second insulating layer 17 each may be selected as $SiN_x$, $SiO_x$ or $SiN_xO_y$, a material of the third insulating layer 21 and a material of the fourth insulating layer 22 also can be selected as $SiN_x$, $SiO_x$ or $SiN_xO_y$.

Even still further, since the material of the planarization layer 13 is an organic material, the problem of poor adhesion between the connecting wire 14 and the planarization layer 13 may be existed when the planarization layer 13 is directly prepared with the connecting wire 14 thereon. Therefore, in this embodiment, a fifth insulating layer 23 firstly is disposed on the planarization layer 13, and then the connecting wire 14 is formed on the fifth insulating layer 23. A material of the fifth insulating layer 23 is $SiN_x$, $SiO_x$ or $SiN_xO_y$.

More specifically, a manufacturing process of the array substrate 30 mainly including the following steps.

S10, providing a glass substrate 11 and forming an array of thin film transistors 12 on the glass substrate 11.

S20, forming a planarization layer 13 on the glass substrate 11 having the thin film transistors 12 formed thereon.

S30, forming a connecting wire 14 on the planarization layer 13. In particular, firstly using a deposition process to form a thin film layer for the connecting wire 14 on the planarization layer 13, and then using a photolithography process to obtain a patterned connecting wire 14.

S40, forming a first insulating layer 15 on the planarization layer 13 having the connecting wire 14 formed thereon. The first insulating layer 15 covers the connecting wire 14 and the planarization layer 13.

S50, forming a first via hole 19 in a position of the first insulating layer 15 corresponding to the connecting wire 14. The first via hole 19 is obtained mainly by a photolithography process.

S60, forming a touch sensing electrode 16 on the first insulating layer 15, and the touch sensing electrode 16 being electrically connected to the connecting wire 14 by the first via hole 19. In particular, firstly using a deposition process to form a thin film layer for the touch sensing electrode 16 on the first insulating layer 15, and then using a photolithography process to obtain a patterned touch sensing electrode 16. More specifically, the touch sensing electrode 16 further is configured as a common electrode, and therefore the step S60 also can be understood as that: firstly using a deposition process to form a common electrode thin film layer on the first insulating layer 15, and then using a photolithography process to divide the common electrode thin film layer into multiple patterned touch sensing electrodes 16. Accordingly, a plurality of touch sensing electrodes 16 in a same structural layer can be used as common electrodes for displaying, so that during a displaying time period of a frame of image, each the touch sensing electrode 16 is used to transmit/deliver a common voltage (Vcom) and a touch control signal in time division manner.

S70, forming a second insulating layer 17 on the first insulating layer 15 having the touch sensing electrode 16 formed thereon, and forming a second via hole 20 in positions of the second insulating layer 17, the first insulating layer 15 and the planarization layer 13 corresponding to the thin film transistor 12. The second insulating layer 17 is disposed covering the touch sensing electrode 16 and the first insulating layer 15, and the second via hole 20 is formed by a photolithography process.

S80, forming a pixel electrode 18 on the second insulating layer 17, and the pixel electrode 18 being electrically connected to the thin film transistor 12 by the second via hole 20. Specifically, a deposition process is used to form a thin film layer for the pixel electrode 18 on the second insulating layer 17, and then a photolithography process is used to obtain a patterned pixel electrode 18.

Figure 5:
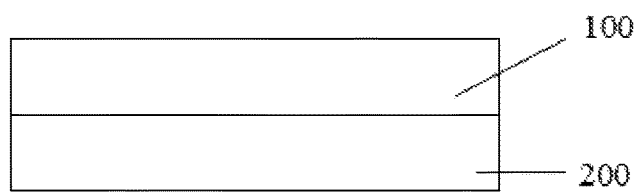
FIG. 5 is a structural schematic view of a liquid crystal display device according to an embodiment of the invention.

In FIG. 5, an embodiment of the invention provides a liquid crystal display (LCD) device. The liquid crystal display device includes an in-cell type touch panel 100 as above described and a backlight module 200. The in-cell type touch panel 100 and the backlight 200 are disposed opposite to each other. The backlight module 200 is configured for providing a display light source to the in-cell type touch panel 100, in order to make the in-cell type touch panel 100 to display an image.

In summary, for each of the in-cell type touch panels according to various embodiments of the invention, the array substrate of the in-cell type touch panel is provided with the connecting wire, the touch sensing electrode and the pixel electrode from bottom to top in that order. Therefore, when the thickness of the first insulating layer between the touch sensing electrode and the connecting wire is increased, the relative distance between the touch sensing electrode and the pixel electrode would not change, so that the storage capacitor formed between the touch sensing electrode and the pixel electrode is not changed. Base on the above discussion, in the in-cell type touch panel according to the invention, by increasing the thickness of the insulating layer between the touch sensing electrode and the connecting wire, it can reduce the parasitic capacitance formed by the touch sensing electrode and the connecting wire and achieve the purpose of improving the signal-to-noise ratio of the touch panel.

It is indicated that, in this specification, the relational terminologies such as "first" and "second" only are intended to discriminate an entity or operation from another entity or operation, and not necessarily to require or imply these entities or operations having actual relationships or orders existed therebetween. Moreover, the terminology of "including", "containing" or variations thereof is meant to cover non-exclusive inclusion, so that a process, method, article or apparatus including a series of items not only includes listed items but also includes other item(s) not being explicitly listed or inherent item(s) of the process, method, article or apparatus. In the absence of more restrictive conditions, the item limited by the phraseology "including one" does not exclude the existence of additional identical item(s) in the process, method, article or apparatus including the item.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An in-cell type touch panel comprising an array substrate; wherein the array substrate comprises: a glass substrate, thin film transistors disposed on the glass substrate in an array, a planarization layer overlying the thin film transistors, a connecting wire formed on the planarization layer, a first insulating layer overlying on the connecting wire, a touch sensing electrode formed on the first insulating layer, a second insulating layer overlying the touch sensing electrode, and a pixel electrode formed on the second insulating layer; wherein the connecting wire is electrically connected to the touch sensing electrode by a first via hole disposed in the first insulating layer, the pixel electrode is electrically connected to a corresponding one of the thin film transistors by a second via hole disposed in the second insulating layer, the first insluting layer and the planarization layer; wherein the touch sensing electrode further is configured as a common electrode, and during a displaying time period of a frame of image, the touch sensing electrode is configured for transmitting a common voltage and a touch control signal in time division manner;

wherein the connecting wire, the first insulating layer, the touch sensing electrode, the second insulating layer, and the pixel electrode are formed on the planarization layer in sequence in a predetermined direction pointing away from the planarization layer, such that the pixel electrode is further away from the planarization layer than the touch sensing electrode in the predetermined direction and a distance between the pixel electrode and the connecting wire in the predetermined direction is greater than a distance between the touch sensing electrode and the connecting wire.

2. The in-cell type touch panel according to claim 1, wherein a material of the connecting wire is a metal material, a material of the touch sensing electrode and a material of the pixel electrode each are ITO.

3. The in-cell type touch panel according to claim 1, wherein a material of the first insulating layer and a material the second insulating layer each are $SiN_x$, $SiO_x$ or $SiN_xO_y$.

4. The in-cell type touch panel according to claim 1, wherein each of the thin film transistors comprises a source electrode, a drain electrode, a gate electrode and an active layer; the active layer is connected onto the glass substrate, the source electrode and the drain electrode are disposed in a same layer and located above the active layer, the gate electrode is disposed above the source electrode and the drain electrode; a third insulating layer is disposed between the source electrode and the active layer as well as between the drain electrode and the active layer; the source electrode and the drain electrode respectively are connected to the active layer by via holes disposed in the third insulating layer; a fourth insulating layer is disposed between the source electrode and the gate electrode as well as between the drain electrode and the gate electrode.

5. The in-cell type touch panel according to claim 4, wherein an ohmic contact layer is arranged between the active layer and the source electrode as well as between the active layer and the drain electrode.

6. The in-cell type touch panel according to claim 4, wherein a material of the third insulating layer and a material of the fourth insulating layer each are $SiN_x$, $SiO_x$ or $SiN_xO_y$.

7. The in-cell type touch panel according to claim 1, wherein the in-cell type touch panel further comprises a color filter substrate disposed opposite to the array substrate and a liquid crystal layer arranged between the array substrate and the color filter substrate.

8. The in-cell type touch panel according to claim 1, wherein a fifth insulating layer is arranged between the planarization layer and the connecting wire, a material of the fifth insulating layer is $SiN_x$, $SiO_x$ or $SiN_xO_y$.

9. A liquid crystal display device comprising a liquid crystal display panel and a backlight module, wherein the liquid crystal display panel and the backlight module are disposed opposite to each other, the backlight module is configured for providing a display light source to the liquid crystal display panel in order to make the liquid crystal display panel display an image, the liquid crystal display panel is an in-cell type touch panel;
wherein the in-cell type touch panel comprises an array substrate, the array substrate comprises: a glass substrate, thin film transistors disposed on the glass substrate in an array, a planarization layer overlying the thin film transistors, a connecting wire formed on the planarization layer, a first insulating layer overlying the connecting wire, a touch sensing electrode formed on the first insulating layer, a second insulating layer overlying the touch sensing electrode and a pixel electrode formed on the second insulating layer; wherein the connecting wire is electrically connected to the touch sensing electrode by a first via hole disposed in the first insulating layer, the pixel electrode is electrically connected to a corresponding one of the thin film transistors by a second via hole disposed in the second insulating layer, the first insulting layer and the planarization layer; wherein the touch sensing electrode further is configured as a common electrode, and during a displaying time period of a frame of image, the touch sensing electrode is configured for transmitting a common voltage and a touch control signal in time division manner;
wherein the connecting wire, the first insulating layer, the touch sensing electrode, the second insulating layer, and the pixel electrode are formed on the planarization layer in sequence in a predetermined direction pointing away from the planarization layer, such that the pixel electrode is further away from the planarization layer than the touch sensing electrode in the predetermined direction and a distance between the pixel electrode and the connecting wire in the predetermined direction is greater than a distance between the touch sensing electrode and the connecting wire.

10. The liquid crystal display device according to claim 9, wherein a material of the connecting wire is a metal material, a material of the touch sensing electrode and a material of the pixel electrode each are ITO.

11. The liquid crystal display device according to claim 9, wherein a material of the first insulating layer and a material of the second insulating layer each are $SiN_x$, $SiO_x$ or $SiN_xO_y$.

12. The liquid crystal display device according to claim 9, wherein each of the thin film transistors comprises a source electrode, a drain electrode, a gate electrode and an active layer; the active layer is connected onto the glass substrate, the source electrode and drain electrode are disposed in a same layer and located above the active layer, the gate electrode is disposed above the source electrode and the drain electrode; a third insulating layer is disposed between the source electrode and the active layer as well as between the drain electrode and the active layer, the source electrode and the drain electrode respectively are connected to the active layer by via holes formed in the third insulating layer; a fourth insulating layer is disposed between the source electrode and the gate electrode as well as between the drain electrode and the gate electrode.

13. The liquid crystal display device according to claim 12, wherein an ohmic contact layer is arranged between the active layer and the source electrode as well as between the active layer and the drain electrode.

14. The liquid crystal display device according to claim 12, wherein a material of the third insulating layer and a material of the fourth insulating layer each are $SiN_x$, $SiO_x$ or $SiN_xO_y$.

15. The liquid crystal display device according to claim 9, wherein the in-cell type touch panel further comprises a color filter substrate disposed opposite to the array substrate and a liquid crystal layer arranged between the array substrate and the color filter substrate.

16. The liquid crystal display device according to claim 9, wherein a fifth insulating layer is arranged between the planarization layer and the connecting wire, a material of the fifth insulating layer is $SiN_x$, $SiO_x$ or $SiN_xO_y$.

* * * * *